United States Patent
Krishnaswamy et al.

(10) Patent No.: US 8,037,443 B1
(45) Date of Patent: Oct. 11, 2011

(54) SYSTEM, METHOD, AND COMPUTER PROGRAM PRODUCT FOR OPTIMIZING AN ALTERED HARDWARE DESIGN UTILIZING POWER REPORTS

(75) Inventors: Venkatram Krishnaswamy, Los Altos, CA (US); Vipul Gupta, San Jose, CA (US)

(73) Assignee: Calypto Design Systems, Inc., Santa Clara, CA (US)

( * ) Notice: Subject to any disclaimer, the term of this patent is extended or adjusted under 35 U.S.C. 154(b) by 166 days.

(21) Appl. No.: 12/497,340

(22) Filed: Jul. 2, 2009

(51) Int. Cl.
*G06F 17/50* (2006.01)

(52) U.S. Cl. ........ 716/133; 716/108; 716/109; 716/120; 716/132; 716/127

(58) Field of Classification Search .................. 716/103, 716/106, 108, 109, 105, 120, 132, 133, 127
See application file for complete search history.

(56) References Cited

U.S. PATENT DOCUMENTS

| | | | |
|---|---|---|---|
| 7,162,704 B2 * | 1/2007 | Oktem | 716/114 |
| 7,337,100 B1 * | 2/2008 | Hutton et al. | 703/13 |
| 7,840,918 B1 * | 11/2010 | Duthou | 716/132 |
| 7,882,458 B2 * | 2/2011 | Tamaki et al. | 716/132 |
| 2005/0132316 A1 * | 6/2005 | Suaris et al. | 716/11 |
| 2005/0204316 A1 * | 9/2005 | Nebel et al. | 716/2 |
| 2007/0083831 A1 * | 4/2007 | Hamilton et al. | 716/1 |
| 2010/0064190 A1 * | 3/2010 | Ward et al. | 714/726 |

* cited by examiner

*Primary Examiner* — Nghia Doan
*Assistant Examiner* — Brian Ngo
(74) *Attorney, Agent, or Firm* — Zilka-Kotab, PC

(57) ABSTRACT

A system, method and computer program product are provided for optimizing an altered hardware design utilizing power reports. In use, a first hardware design is synthesized. Additionally, a first power report is generated for the synthesized first hardware design. Further, the first hardware design is altered. Further still, the altered hardware design is synthesized. Also, a second power report is generated for the synthesized altered hardware design. Furthermore, the altered hardware design is optimized utilizing the first power report and the second power report.

18 Claims, 6 Drawing Sheets

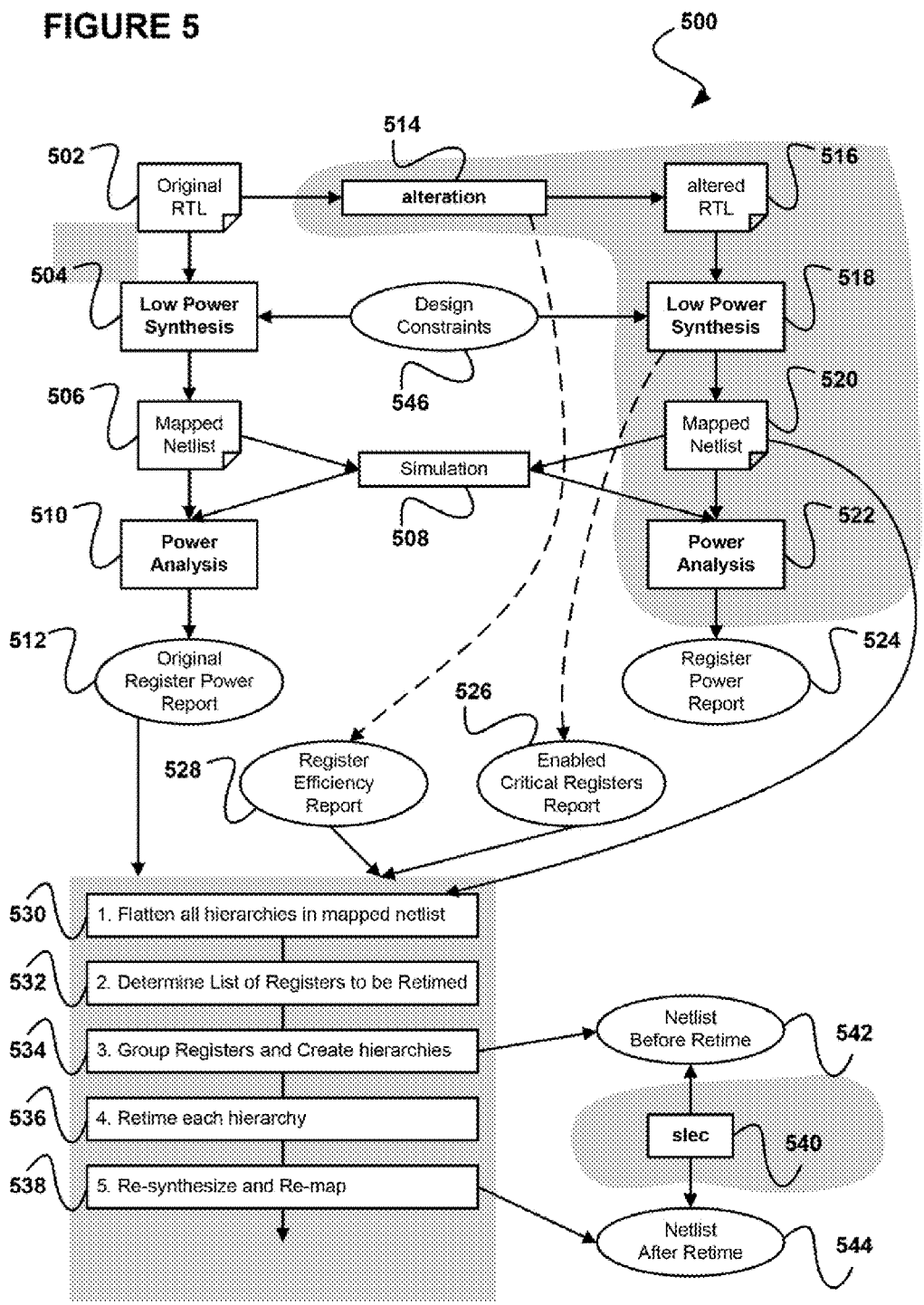

SYSTEM, METHOD, AND COMPUTER PROGRAM PRODUCT FOR OPTIMIZING AN ALTERED HARDWARE DESIGN UTILIZING POWER REPORTS

FIELD OF THE INVENTION

The present invention relates to hardware designs, and more particularly to optimizing altered hardware designs.

BACKGROUND

Hardware designs have traditionally proven useful in the creation of circuits and other electronic hardware. For example, files created utilizing hardware design languages have oftentimes been used for designing and testing circuits and other electronic hardware. However, traditional techniques for optimizing altered hardware designs have generally exhibited various limitations.

For example, traditional techniques that alter hardware designs oftentimes result in inefficient or defective hardware designs that may have to be retimed. However, traditional techniques for optimizing such altered hardware have proven to be time-consuming and difficult to perform, and can result in inefficiencies if performed incorrectly. There is thus a need for addressing these and/or other issues associated with the prior art.

SUMMARY

A system, method and computer program product are provided for optimizing an altered hardware design utilizing power reports. In use, a first hardware design is synthesized. Additionally, a first power report is generated for the synthesized first hardware design. Further, the first hardware design is altered. Further still, the altered hardware design is synthesized. Also, a second power report is generated for the synthesized altered hardware design. Furthermore, the altered hardware design is optimized utilizing the first power report and the second power report.

BRIEF DESCRIPTION OF THE DRAWINGS

FIG. 5 shows an automatic method for sequential optimization, in accordance with another embodiment.

DETAILED DESCRIPTION

Figure 1:
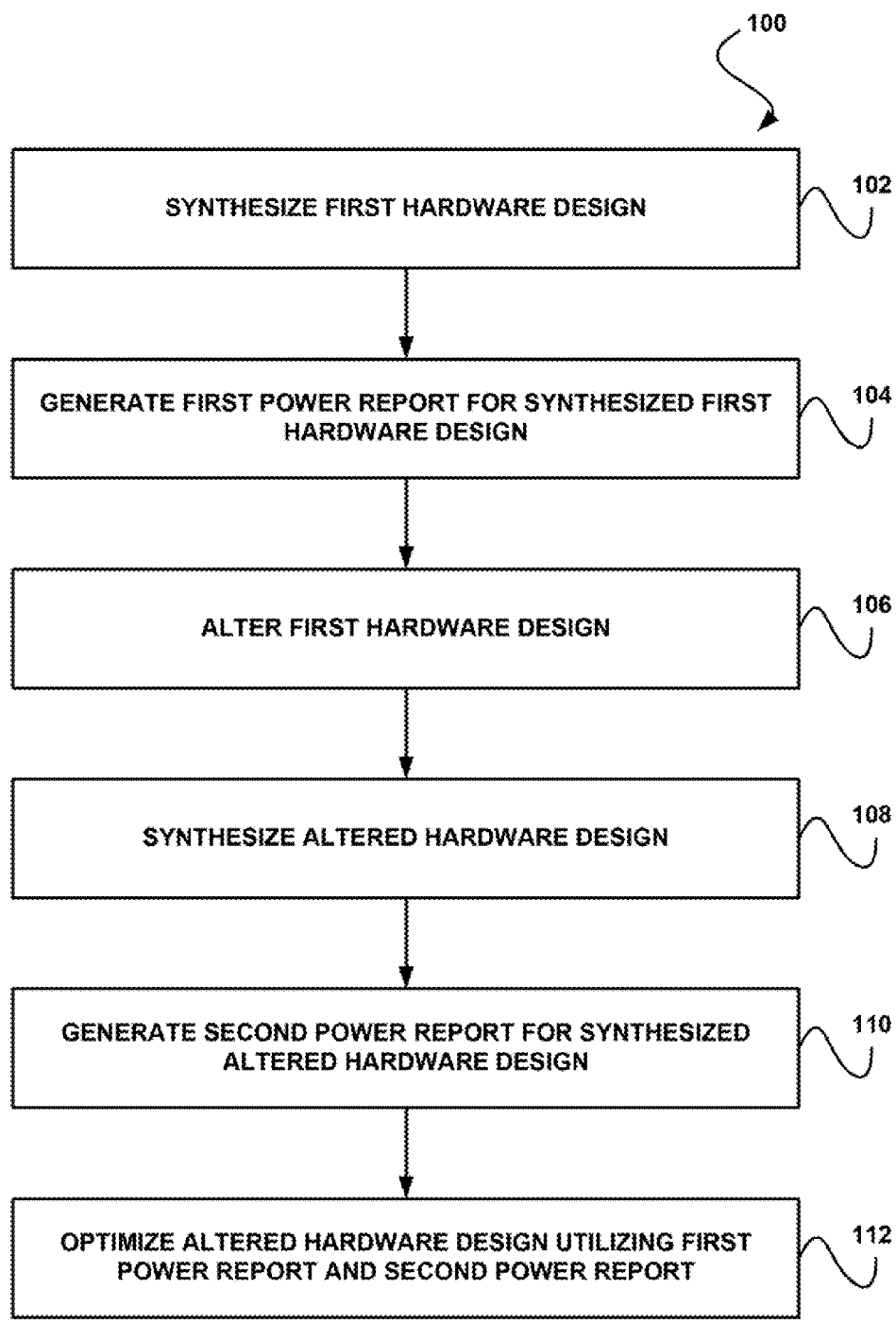
FIG. 1 shows a method for optimizing an altered hardware design utilizing power reports, in accordance with one embodiment.

FIG. 1 shows a method 100 for optimizing an altered hardware design utilizing power reports, in accordance with one embodiment. As shown in operation 102, a first hardware design is synthesized. In the context of the present description, the hardware design may include any design (e.g. design description, etc.) of hardware. In one embodiment, the hardware design may include text. For example, the hardware design may include a register transfer level (RTL) description. In another example, the hardware design may include one or more hardware description language (IIDL) expressions, such as one or more expressions written in Verilog, one or more expressions written in Very High Speed Integrated Circuits hardware description language (VHDL), etc. In yet another example, the hardware design may include a netlist.

Additionally, synthesizing the first hardware design may include performing one or more actions on the first hardware design. For example, synthesizing the first hardware design may include converting the first hardware design to a different format, compiling the first hardware design, creating new data indicative of the first hardware design, etc. For instance, synthesizing the first hardware design may include creating a synthesized gate level design, such as a synthesized gate level netlist. In one embodiment, synthesizing the first hardware design may include performing combinational clock gating on the first hardware design.

As also shown, a first power report is generated for the synthesized first hardware design. Note operation 104. A power report may include any report relating to power associated with a synthesized hardware design. For example, the first power report may indicate the power usage of one or more portions of the synthesized first hardware design, such as logic gates in the synthesized first hardware design, flip-flops in the synthesized first hardware design, registers in the synthesized first hardware design, etc. For instance, the first power report may indicate the power usage of all registers in the synthesized first hardware design.

In one embodiment, a synthesized gate level netlist of the synthesized first hardware design may be simulated in order to obtain gate level simulation vectors. Additionally, a power analysis may be performed on the synthesized gate level design using the simulation vectors in order to obtain a power estimation (included in the power report) for the synthesized first hardware design. In another embodiment, the first power report may be generated for all registers in the synthesized first hardware design.

Still yet, as shown in operation 106, the first hardware design is altered. In one embodiment, the altering may include performing sequential clock gating on the first hardware design. In another embodiment, the altering may include changing a timing constraint of the first hardware design. For example, a clock frequency at which the first hardware design is to be run may be raised or lowered. Of course, however, any alteration to the first hardware design may be performed.

Furthermore, the altered hardware design is synthesized. See operation 108. As noted above, the synthesizing may include performing one or more actions on the altered hardware design. In one embodiment, clock gating efficiency reports may be generated for all registers in the altered hardware design. Further still, in operation 110, a second power report is generated for the synthesized altered hardware design. Additionally, in one embodiment, all altered registers in the synthesized altered hardware design may be identified. Additionally, a list of altered registers in the synthesized altered hardware design may be created.

Also, in operation 112, the altered hardware design is optimized utilizing the first power report and the second power report. In the context of the present description, optimizing the altered hardware design may include performing one or more optimizations to one or more aspects of the altered hardware design. For example, one or more timing alterations may be performed to one or more components of the altered hardware design.

In one embodiment, the optimizing may include dissolving one or more hierarchies in the altered hardware design. For example, a netlist of the altered hardware design may be flattened by dissolving all user hierarchies in the netlist, thereby creating a flattened netlist. In another embodiment, one or more elements of the altered hardware design that need to be retimed may be identified. For example, one or more registers of the altered hardware design may be identified that need to be retimed. In another example, an algorithm may be applied to the flattened netlist to identify one or more registers that need to be retimed.

Additionally, in another embodiment, the first power report and the second power report may be used to identify the registers of the altered hardware design that need to be retimed. For example, the first power report and the second power report may be used by an algorithm in order to identify one or more registers in the flattened netlist that need to be retimed. In another example, the first power report and the second power report may be compared in order to determine one or more registers that have increased in power usage from the first hardware design to the altered hardware design and that can benefit from retiming.

Further, in another embodiment, the optimizing may include creating one or more new hierarchies in the altered hardware design. In one embodiment, the new hierarchies may include retimed hierarchies. For example, one or more sequential levels may be traversed from each register in the altered hardware design that needs to be retimed. Additionally, all elements within the traversal may be grouped into a new hierarchy in the altered hardware design. Further still, the optimizing may include retiming the new hierarchies in the altered hardware design. For example, each retimed hierarchy in the altered hardware design may be retimed.

In another embodiment, the optimized hardware design may be synthesized. For example, the optimized hardware design may be re-synthesized after retiming has been performed on each hierarchy in the optimized hardware design. Further, in yet another embodiment, the optimized hardware design may be re-mapped. Additionally, the optimized hardware design may be verified. For example, each of the new hierarchies in the optimized hardware design may be compared before and after retiming for equivalence. As another option, the optimized hardware design may be verified.

In this way, problems or inefficiencies that may have been encountered by retiming the hierarchies of the altered hardware design may be avoided by retiming the new hierarchies of the optimized hardware design, which have been grouped according to power usage. Additionally, the results of the comparison of the first and second power reports may assist in guiding the retiming of the altered hardware design as well as the synthesis of the optimized hardware design.

Clock gating is a technique that may be used for reducing dynamic power in digital designs. In one embodiment, sequential clock gating may be successfully automated and may be adopted as a means of reducing power more aggressively. Sequential clock gating may include analyzing the behavior of circuits across multiple cycles in order to identify registers that are written but not read, or clocked when data is unchanging. Enable conditions may be generated to inhibit clocks from toggling to such registers, and may be implemented into the logic. In this way, for designs that are not timing critical, this technique may provide excellent results.

However, in one embodiment, for designs that are timing critical, such as CPU cores, including ARM, Tensilica or MIPS cores, the power savings brought about by sequential clock gating may not necessarily be as pronounced. This may be because the new enables inserted by the process of sequential clock gating may further load already critical paths. The synthesis process therefore may attempt to meet timing by increasing the gate sizes of the logic involved. Larger gate sizes may lead to greater power dissipation, thus negating the power gains from sequential clock gating.

Accordingly, in one embodiment, sequential clock gating is provided which may be followed by targeted sequential retiming to optionally preserve the power improvement brought about using sequential clock gating. Sequentially retiming the correct portions of the design may relax the timing criticality of signals used for sequential clock gating. Thus, the gate sizes of the devices used in logic may not necessarily need to be as high, which may lead to lower overall power dissipation. One element may involve correctly identifying self-contained portions of the design where retiming must follow sequential clock gating because blindly retiming the entire design may lead to sub-optimal area and power. The key regions of the design that may be retimed may also be identified. Significant power savings may accrue through the use of the following described techniques.

One significant component of dynamic power dissipation for a logic gate may be known as switching power, and it may be given by the formula $\frac{1}{2} * C_L * V_{DD})*f$, where $C_L$ is the load capacitance, $V_{DD}$ is the supply voltage, and f is the rate at which the output of the gate switches. One method for reducing this component of dynamic power dissipation may be to reduce the rate at which the gate switches (or f). In synchronous digital designs, this may be accomplished by gating off the clock to a subcircuit when it is known that the inputs to that subcircuit do not change, or if it is known that the output computed by that subcircuit will not be used. These determinations may be made by a designer, and expressed in register transfer level (RTL) code using an enable condition that qualifies assignment to a register. Table 1 illustrates one exemplary instance of code using an enable condition that qualifies assignment to a register. It should be noted that such code is set forth for illustrative purposes only, and thus should not be construed as limiting in any manner.

TABLE 1

```
always @ (posedge clk)
begin
    if (clock_en)
        q <= d;
end
```

These enable conditions may be moved into the clock tree through connection to integrated clock gating (ICG) cells by the synthesis process. The designer may be responsible to create the logic that generates the signal, clock_en. In on embodiment, the generation of such an enable signal may be performed through a logical function that will be referred to as the enable function, $f_e$. The generation of $f_e$ may require addition of logic gates that are not strictly required for the determination of functional outputs, although they save power. These extra gates may increase the capacitive load, $C_L$ on the drivers of the variables that are input to $f_e$. The delay of a logic gate may be directly proportional to the load capacitance, $C_L$. Therefore, addition of enable logic for the purpose of saving power may impact the arrival time of a signal at a register. For a timing critical design, this may result in a timing violation. In order to avoid this timing violation, the synthesis tool may "upsize" logic gates, or use gates that are constructed from transistors with higher gate lengths ($G_L$). This is because the delay of a gate is directly proportional to the gate length. However, the use of transistors with higher gate lengths may result in increasing the capacitive loads ($C_L$) of the gate drivers. This may result in an increase in the switching power of these drivers.

Therefore, for timing critical designs, there may be conflicting design goals that need to be balanced. In order to reduce power, gates may be added that increase load capacitances ($C_L$). However, this may have the impact of forcing the synthesis tool to upsize gates, should it find it difficult to meet the cycle time constraint. The result may be that overall power increases or worse, the cycle time constraint may not be achievable. The desired outcome for such designs is to achieve both the goals: lowering power, while not impacting timing. Sequential optimizations may be utilized to achieve both goals.

Optimization techniques for power and timing may be combinational in nature. The functional scope of optimization may be related to logic that functions within a single clock cycle. Structurally, that scope may be identified by located register bounded regions of the design.

Such combinational optimizations for power boils may include locating enabled registers (those that feedback from the output to the input through a multiplexor, with the enable condition controlling the select input). Such configurations may be implemented as registers with gated clocks (through the use of ICG cells with the enable condition connected to their enable pin, rather than to the register itself). This may force the clocks to the concerned registers not to switch when the enable condition is de-asserted. However, enable conditions may need to be present in the design for them to be implemented as described above.

Timing optimizations in combinational regions may be performed through applying appropriate logic restructuring followed by gate sizing and selection of devices with appropriate threshold voltages ($V_{Th}$). For devices that must dissipate low power while achieving a high performance (frequency), the scope of optimization may be enhanced across cycles. This may be true for both power and performance optimization. Sequential techniques for power and performance optimization may be referred to as sequential clock gating and sequential retiming, respectively.

Sequential analysis may impact power savings because sequential clock gating not only shuts off the registers, but also the datapath driven by the registers and logic for unused data and reduces switching for longer periods of time. This may require an experienced hardware designer using sequential analysis based on activity over multiple clock cycles to decide what registers can be gated and under what enable conditions.

Figure 2A:
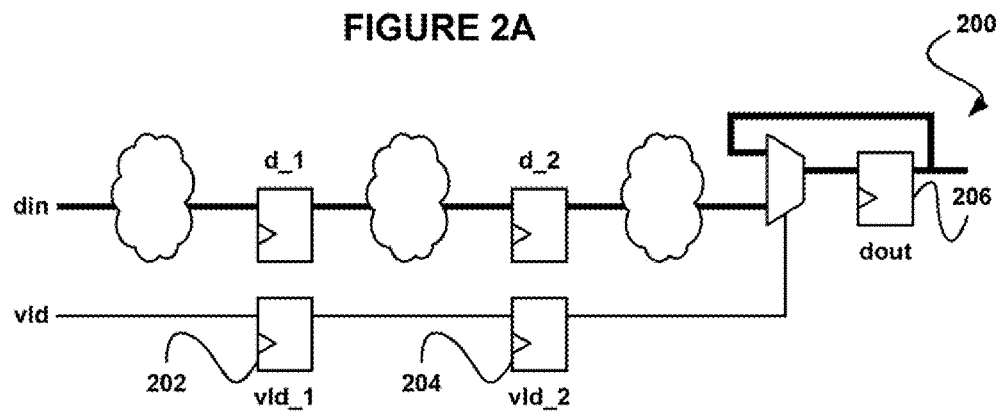
FIG. 2A shows a simple circuit datapath, in accordance with another embodiment.
Figure 2B:
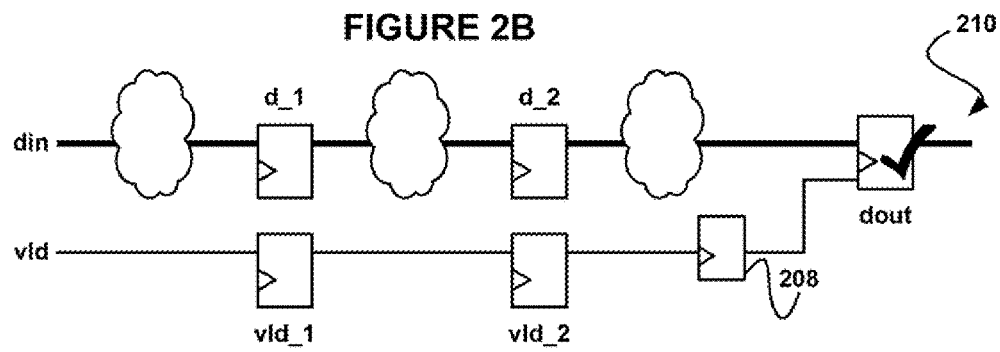
FIG. 2B shows resulting logic created by applying combinational clock gating transformations to a simple circuit datapath, in accordance with yet another embodiment.

The following FIGS. 2A-4B illustrate clock gating that may be enabled by sequential optimization. FIG. 2A illustrates a simple circuit datapath 200 in accordance with another embodiment, where data flows through two combinational computational stages 202 and 204 before being latched into the output register 206. FIG. 2B illustrates the resulting logic 210 created by applying combinational clock gating transformations 208 to the simple circuit datapath 200 in FIG. 2A by logic synthesis tools, in accordance with one embodiment.

Figure 2C:
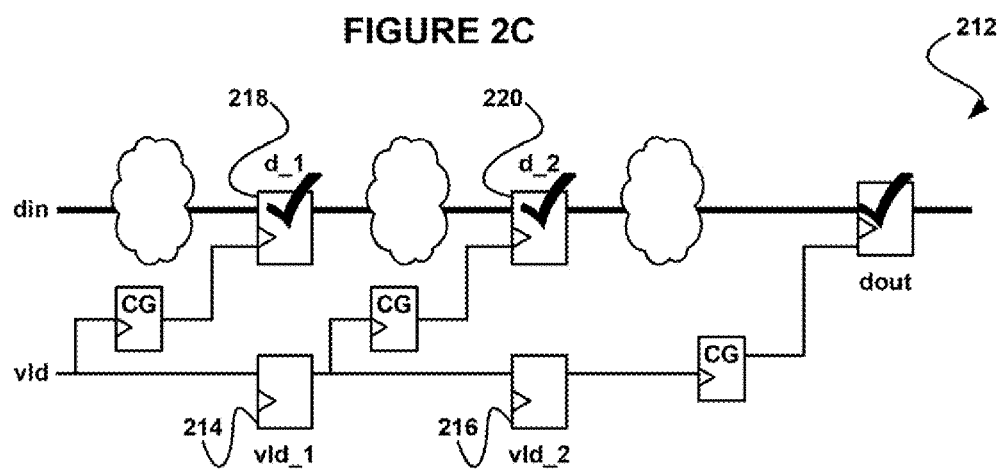
FIG. 2C shows resulting clock gated logic created by performing sequential clock gating on a simple circuit datapath, in accordance with still yet another embodiment.

Additionally, FIG. 2C illustrates the resulting clock gated logic 212 created by performing sequential clock gating on the simple circuit datapath 200 in FIG. 2A. Performing sequential clock gating may find new enable conditions 214 and 216 using advanced sequential analysis. Additionally, additional gating 218 and 220 result due to the enables inserted by sequential clock gating.

Figure 3A:
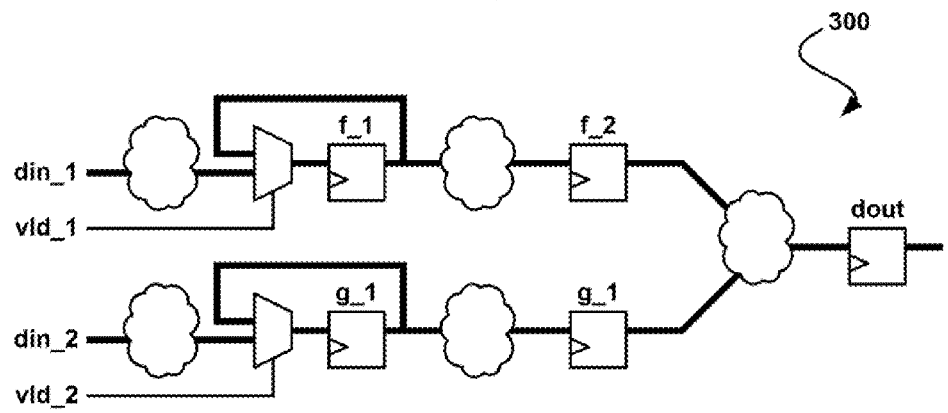
FIG. 3A shows original register transfer level (RTL) logic, in accordance with another embodiment.
Figure 3B:
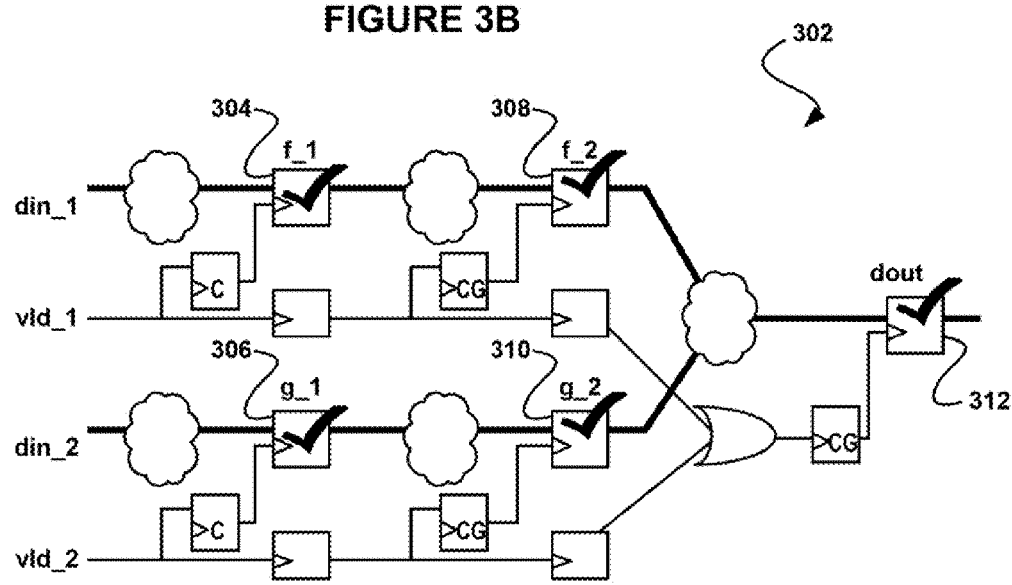
FIG. 3B shows sequential clock gating optimized RTL logic, in accordance with another embodiment.

The type of clock gating performed in FIG. 2C is called observability based sequential clock gating. An additional type of clock gating that sequential clock gating employs may include input stability based sequential clock gating. For example, FIG. 3A illustrates original RTL logic 300, and FIG. 3B, which illustrates sequential clock gating optimized RTL logic 302. Shown are combinational clock gating opportunities 304 and 306 that existing logic synthesis products might be able to recognize, and sequential clock gating opportunities 308, 310, and 312 that are uniquely discovered by sequential clock gating.

In one embodiment, a schematic of the user RTL may be viewed through a sequential clock gating analyzer. This may help in effective debugging, especially in analyzing the enable logic generated and how the enable signal generated helps in reducing the switching power of the related flop.

Additionally, sequential clock gating may generate the sequential enable signals for all the opportunities identified by it. These enables may eventually be moved to the corresponding clocks by a downstream logic synthesis tool during the process of placement of integrated clock gating cells. Further, in one embodiment, the process of sequential clock gating may be successfully automated.

In designs that are timing critical, it may be ensured that the delay incurred through logic gates in a path between registers is less than or equal to the cycle time minus clock uncertainty. For reasons of logical clarity in design, it may often be the case that in a design the timing slack (difference between clock cycle time and logic delay of the stage) between subsequent pipeline stages is quite substantial. The process of sequential retiming may balance logic across pipeline stages and may bring the timing slack numbers close to one another. In so doing, the design may be made less timing critical. However, the process may require logic restructuring in a non-intuitive manner.

Figure 4A:
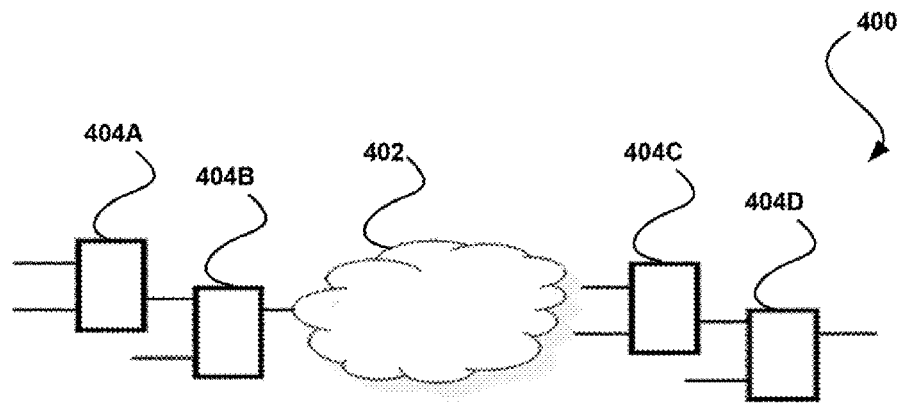
FIG. 4A shows a design where logic is enclosed between pipeline registers, in accordance with yet another embodiment.
Figure 4B:
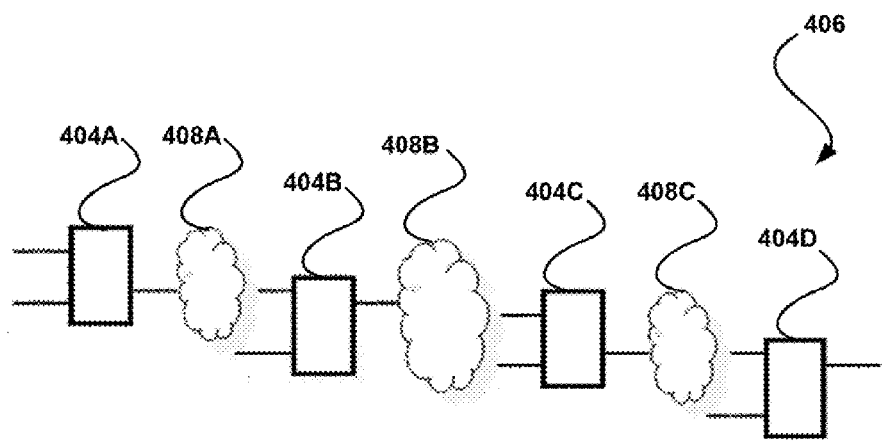
FIG. 4B shows a design where logic is retimed, or spread, across adjacent pipeline registers, in accordance with still yet another embodiment.

The retiming process is illustrated in FIGS. 4A and 4B. More specifically, FIG. 4A illustrates a design 400 where logic 402 is enclosed between pipeline registers 404A-D. Additionally, FIG. 4B illustrates a design 406 where logic 408A-C is retimed, or spread, across adjacent pipeline registers 404A-D.

It should be noted that the process of retiming may be a non-trivial process. One reason for this is that blind retiming may lead to an area increases (as the number of registers could increase), and certain logic styles (e.g., control intensive logic, etc.) may be less amenable to a benefit from retiming than others (e.g., datapath oriented logic, etc.). In one embodiment, the region in which retiming is performed in control dominated designs such as CPU cores may be carefully identified and bounded. Additionally, the process of sequential retiming may be automated. However, even in automatic retiming processes, the onus may be on the user to identify the optimal regions for retiming.

Therefore, an automated procedure may be created that applies sequential clock gating, followed by identification of targeted regions for retiming that may result in a reduction of dynamic power in timing critical designs such as ARM, MIPS and Tensilica cores.

FIG. 5 shows an automatic method 500 for sequential optimization, in accordance with another embodiment. As an option, the method 500 may be carried out in the context of the details of FIGS. 1-4B. Of course, however, the method 500 may be carried out in any desired environment. Further, the aforementioned definitions may equally apply to the description below.

As shown in operation 504, an original RTL 502 is synthesized with a combinational clock gating option being performed using design constraints and a technology library. Additionally, a synthesized gate level netlist 506 is simulated 508 to get representative gate level simulation vectors, and power analysis 510 is performed on the synthesized gate level design using the simulation vectors to get the original RTL power estimation. Further, register power reports 512 are generated for all the registers.

Further still, as shown in operation 514, the original RTL 502 is altered in order to generate an altered RTL 516 along with clock gating efficiency reports 528 for all the registers in the design. In one embodiment, sequential clock gating may be performed on the original RTL 502 in order to generate the altered RTL 516. In another embodiment, the timing constraints (e.g., the clock frequencies used, etc.) of the original RTL 502 may be adjusted in order to generate the altered RTL 516. Of course, however, any alteration may be performed on the original RTL 502 in order to generate the altered RTL 516.

Also, the altered RTL 516 is synthesized in operation 518 with combinational clock gating using the same constraints 546 and technology library as in operation 504. In addition, a list of registers that have been sequentially clock gated is identified (not shown). For example, a list of registers that have clock gating enables added by the alteration and that lie in timing critical paths may be identified. These registers may either not meet timing slack or may be very hard to meet timing. Additionally, a file 526 having a list of such registers may be generated. Further, a gate level simulation 508 is performed on a mapped netlist 520 and a power analysis 522 is performed to generate a register power report 524 for all the registers.

Further still, an automatic procedure is performed for identifying regions of the netlist to be retimed and then retiming is performed (not shown). In general, the procedure loads the altered RTL 516 synthesis session in the low power synthesis tool, applies an algorithm to identify and create regions for retiming, performs retiming on those regions, and finally synthesizes and maps the whole design to get the final gate level netlist.

Specifically, in operation 530 all hierarchies in the mapped netlist 520 are flattened. The mapped netlist 520 is completely flattened so as to have only library cells. In this way, all the user hierarchies are dissolved. Additionally, a list of registers to be retimed is determined in operation 532. For example, the flattened netlist from operation 530, the register power reports 512 and 524, the enabled critical registers list 526, and the register clock gating efficiency report 528 may be used in determination of the retiming.

Table 2 illustrates one exemplary instance of pseudo code that describes an algorithm used for determining list of registers to be retimed in operation 532. It should be noted that such pseudo code is set forth for illustrative purposes only, and thus should not be construed as limiting in any manner.

TABLE 2

```
#generate a file having register power difference by subtracting
#altered register power from original register power
#This file will have this difference for each register in the
#design
generate_register_power_difference    (original_reg_pwr,
                                       powerpro_reg_pwr)
#This procedure returns list of registers from critical path
#report to be retimed. It reads the file having register
#power differences and takes register width threshold,
#register clock gating efficiency threshold and register power
# difference threshold as inputs. Optionally it takes number of
#levels for which registers can be grouped together to form
#retiming hierarchy. Default value is 2.
#List that is returned has a separator "next" to indicate which
#registers should be grouped together in one retime hierarchy
get_list_of_registers_to_be_retimed   (reg_pwr_diff_file,
                                       .ppro_eff_report_file,
                                       register_width_thres,
                                       register_efficiency_thres,
                                       register_power_diff_thres,
                                       lookback_levels_numbers,
                                       hier_levels_to_be_grouped,
                                       enabled_critical_path_regs)
{
    read_register_power_difference_file
    read_powerpo_clock_gating_efficiency_report
    list_of_register_to_be_retimed { }
    foreach_register_in_critical_path_list {
        if (register_width * register_efficiency <
                register_width_thres * register_efficiency_thres) {
            continue
        } else {
            #lookback_levels_number is defaulted to 1 only
            get_registers_in_fanin_only_one_level
            foreach_register_in_fanin_only_one_level {
                get_register_power_difference_for_register
                if (register_power_diff <=
                                    register_power_diff_thres) {
                    append_critical_path_reg_to_retime_list
                    continue
                }
            }
        }
    }
    return list_of_register_to_be_retimed
}
```

In one embodiment, this procedure returns a list of registers to be retimed separated by "next." The elements of this list may be a subset of registers that were enabled by the alteration 514 and were in a timing critical path. These elements may be the start points for getting elements in the timing critical paths and for creating hierarchies for retiming.

Additionally, in operation 534 registers are grouped and hierarchies are created. This procedure may take the above list of registers (start points) and traverse a specified number of sequential levels backwards (in the fanin) as well as same number of specified levels forward (in the fanout) of the start point and collect all the elements in these paths together. Further, a sequential level is defined as a next level of registers in the fanin or fanout of a register. In one embodiment, the sequential level by default is 1, but in other embodiments it may be changed to another value. Further still, all the elements collected together for all the start-point registers that are supposed to be grouped are made into a separate hierarchy in the netlist. These form the retime hierarchies that are created and will be retimed in a later operation. Additionally, this procedure returns the number of hierarchies created so that retiming can be called on each of them.

Table 3 illustrates one exemplary instance of an algorithm that groups registers and creates hierarchies in operation 532. It should be noted such algorithm is set forth for illustrative purposes only, and thus should not be construed as limiting in any manner.

TABLE 3

```
#This procedure traverses on the netlist to get instances in the
#fanin and fanout of each register and then group all these
#instances together in a single hierarchy. Grouping happens based
#on already partitioned start point register lists based on the
#hierarchy levels ( argument hier_levels_to_be_grouped )specified
#in the procedure get_list_of_registers_to_be_retimed described
#above
group_and_create_retime_hierarchies       (register_list,
                                           sequential_levels,
                                           retime_hier_prefix) {
    retime_hier_cnt = 0
    foreach grouped_regs_list in register_list {
        ++ retime_hier_cnt
        retime_hier_inst_list { }
        foreach reg in grouped_regs_list {
            get_all_instances_in_fanin_till_sequential_level
            append in retime_hier_inst_list
            get_all_instances_in_fanout_till_sequential_level
            append in retime_hier_inst_list
        }
        create_retime_hier (retime_hier_inst_list,
                                           retime_hier_prefix)
    }
    return retime_hier_cnt
}
```

Further, in operation 536 each hierarchy is retimed. For example, retiming is called one by one on all the new retiming hierarchies created by the procedure "group_and create_retime_hierarchies." Further still, in operation 538 the whole design is re-synthesized and re-mapped after retiming is done on all the separate retiming hierarchies above.

Also, in operation 540 formal equivalence checking is performed. For example, a comprehensive verification step may be performed to verify gate-level retimed hierarchies using a sequential level equivalence checker tool. Each of the retiming hierarchies created above may be dumped both pre retiming 542 and post retiming 544. Then they may be formally verified to be equivalent using the sequential level equivalence checker tool.

In this way, static power and dynamic power (and hence total power) of the altered hardware design may be improved in the optimized hardware design, in addition to total area and cell count in the synthesized netlist. More specifically, the optimized hardware design created using the above automatic method may be smaller in area and consume less total power than both the original hardware design and the altered hardware design.

Figure 6:
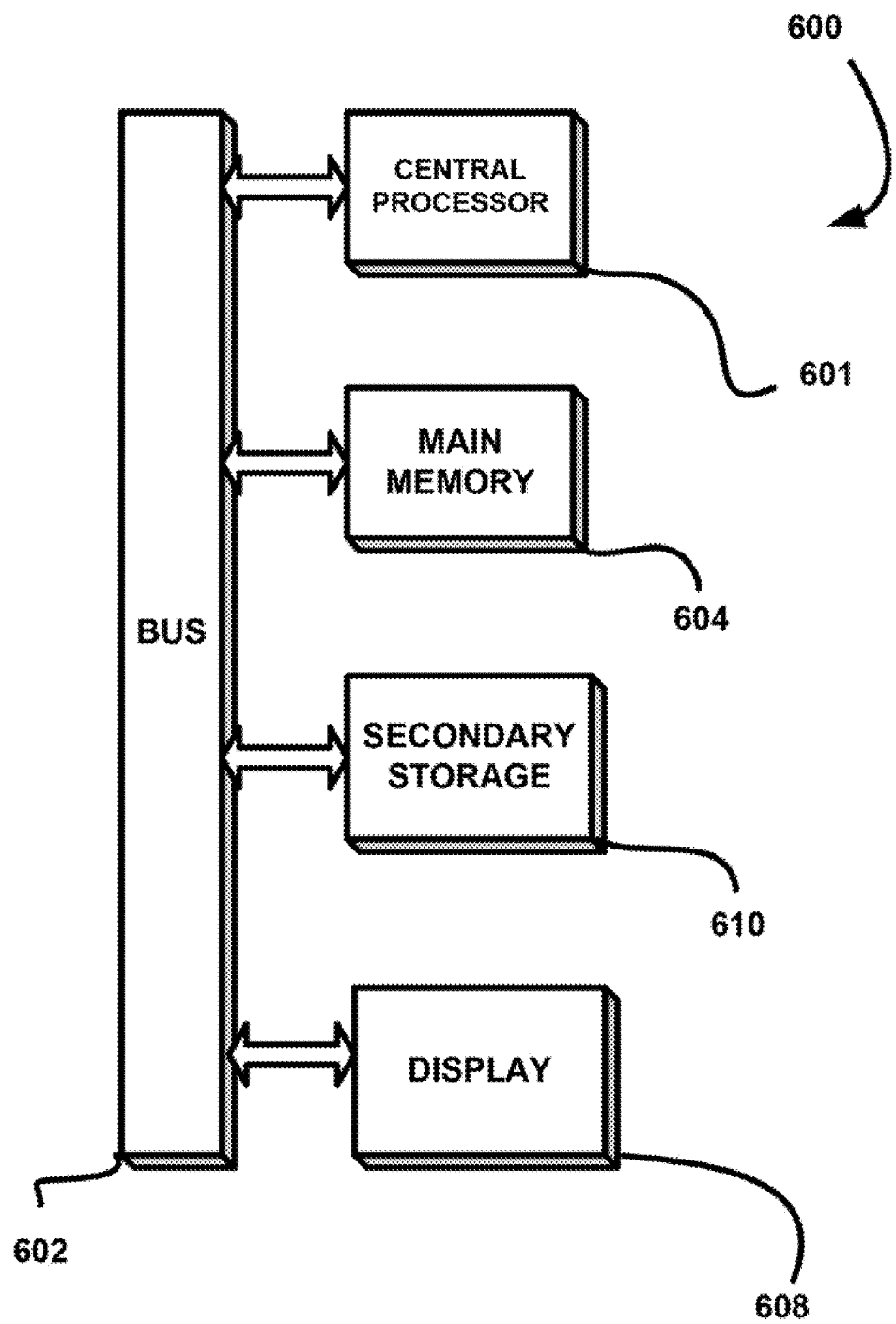
FIG. 6 illustrates an exemplary system, in accordance with one embodiment.

FIG. 6 illustrates an exemplary system 600 with which the various features of FIGS. 1A-5 may be implemented, in accordance with one embodiment. Of course, the system 600 may be implemented in any desired environment.

As shown, a system 600 is provided including at least one central processor 301 which is connected to a communication bus 602. The system 600 also includes main memory 604 [e.g. random access memory (RAM), etc.]. The system 600 also includes a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, such computer programs may be used to carry out the functionality of the previous figures. Further, in other embodiments, the architecture and/or functionality of the various previous figures may be implemented utilizing the host processor 601, a chipset (i.e. a group of integrated circuits designed to work and sold as a unit for performing related functions, etc.), and/or any other integrated circuit for that matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for synthesizing a first hardware design;
   computer code for generating a first power report for the synthesized first hardware design;
   computer code for altering the first hardware design;
   computer code for synthesizing the altered hardware design;
   computer code for generating a second power report for the synthesized altered hardware design; and
   computer code for optimizing the altered hardware design, utilizing the first power report and the second power report;
   wherein the computer program product is operable such that the first power report and the second power report are compared for determining one or more registers that have increased in power usage from the first hardware design to the altered hardware design;
   wherein the optimizing includes identifying one or more registers to be retimed in the altered hardware design;
   wherein the computer program product is operable such that the first power report and the second power report are used to identity the one or more registers to be retimed.

2. The computer program product of claim 1, further comprising computer code for synthesizing the optimized hardware design.

3. The computer program product of claim 1, further comprising computer code for re-mapping the optimized hardware design.

4. The computer program product of claim 1, further comprising computer code for identifying all altered registers in the synthesized altered hardware design.

5. The computer program product of claim 1, wherein the computer program product is operable such that the first power report indicates the power usage of all registers in the synthesized first hardware design.

6. The computer program product of claim 1, further comprising computer code for generating clock gating efficiency reports for all registers in the altered hardware design.

7. The computer program product of claim 1, wherein the optimizing includes dissolving one or more hierarchies in the altered hardware design.

8. The computer program product of claim 1, wherein the optimizing includes creating one or more new hierarchies in the altered hardware design.

9. The computer program product of claim 1, wherein the altering includes performing sequential clock gating on the first hardware design.

10. The computer program product of claim 1, wherein the altering includes changing a timing constraint of the first hardware design.

11. The computer program product of claim 1, wherein the optimizing includes creating retimed hierarchies in the altered hardware design.

12. The computer program product of claim 1, further comprising computer code for verifying the optimized hardware design.

13. The computer program product of claim 1, wherein synthesizing the first hardware design includes performing combinational clock gating on the first hardware design.

14. The computer program product of claim 1, further comprising computer code for simulating a synthesized gate level netlist of the synthesized first hardware design for obtaining gate level simulation vectors.

15. The computer program product of claim 1, wherein optimizing the altered hardware design includes performing one or more timing alterations to one or more components of the altered hardware design;
wherein the optimizing includes identifying one or more registers to be retimed in the altered hardware design;
wherein the system is operable such that the first power report and the second power report are used to identity the one or more registers to be retimed.

16. A computer-implemented method, comprising:
synthesizing a first hardware design, utilizing a processor;
generating a first power report for the synthesized first hardware design;
altering the first hardware design;
synthesizing the altered hardware design;
generating a second power report for the synthesized altered hardware design; and
optimizing the altered hardware design, utilizing the first power report and the second power report;
wherein the first power report and the second power report are compared for determining one or more registers that have increased in power usage from the first hardware design to the altered hardware design;
wherein the optimizing includes identifying one or more registers to be retimed in the altered hardware design;
wherein the first power report and the second power report are used to identity the one or more registers to be retimed.

17. A system, comprising:
a processor for synthesizing a first hardware design, generating a first power report for the synthesized first hardware design, altering the first hardware design, synthesizing the altered hardware design, generating a second power report for the synthesized altered hardware design, and optimizing the altered hardware design utilizing the first power report and the second power report;
wherein the system is operable such that the first power report and the second power report are compared for determining one or more registers that have increased in power usage from the first hardware design to the altered hardware design.

18. The system of claim 17, wherein the processor remains in communication with memory via a bus.

* * * * *